(12) United States Patent
Myers et al.

(10) Patent No.: US 10,372,128 B2
(45) Date of Patent: Aug. 6, 2019

(54) SINKHOLE DETECTION SYSTEMS AND METHODS

(71) Applicant: Ford Global Technologies, LLC, Dearborn, MI (US)

(72) Inventors: Scott Vincent Myers, Camarillo, CA (US); Ashley Elizabeth Micks, Mountain View, CA (US); Alexandru Mihai Gurghian, Palo Alto, CA (US); Harpreetsingh Banvait, Sunnyvale, CA (US); Parsa Mahmoudieh, Vallejo, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 239 days.

(21) Appl. No.: 15/357,980

(22) Filed: Nov. 21, 2016

(65) Prior Publication Data
US 2018/0143631 A1 May 24, 2018

(51) Int. Cl.
| | | |
|---|---|---|
| *G05D 1/00* | (2006.01) | |
| *G08G 1/0967* | (2006.01) | |
| *B60W 30/00* | (2006.01) | |
| *G08G 1/0962* | (2006.01) | |
| *G08G 1/16* | (2006.01) | |
| *G06K 9/00* | (2006.01) | |
| *G06K 9/62* | (2006.01) | |

(52) U.S. Cl.
CPC ........... *G05D 1/0088* (2013.01); *B60W 30/00* (2013.01); *G06K 9/00791* (2013.01); *G06K 9/6288* (2013.01); *G08G 1/0967* (2013.01); *G08G 1/09626* (2013.01); *G08G 1/096791* (2013.01); *G08G 1/162* (2013.01); *G08G 1/167* (2013.01)

(58) Field of Classification Search
CPC ........ G05D 1/0088; G05D 1/02; G05D 1/021; G05D 1/0212; G05D 1/0231; G05D 1/0238; G05D 1/024; G05D 1/0242; G05D 1/0244; G05D 1/0246; G05D 1/0257; G08G 1/0967; G06K 9/00791; G06K 9/00798; G06K 9/00805; B60W 2420/42; B60W 2550/14; B60W 2550/147; B60W 30/09
USPC .................. 701/23, 41, 37, 40, 532; 382/224
See application file for complete search history.

(56) References Cited

U.S. PATENT DOCUMENTS

| | | | | |
|---|---|---|---|---|
| 8,803,966 | B2 * | 8/2014 | Zhang ................ | G06K 9/00798 348/119 |
| 8,917,904 | B2 * | 12/2014 | Zhang ................ | G06K 9/00791 382/103 |
| 9,188,981 | B2 | 11/2015 | Israelsson | |
| 2009/0097038 | A1 | 4/2009 | Magna | |

(Continued)

FOREIGN PATENT DOCUMENTS

| | | |
|---|---|---|
| CN | 203094055 U | 7/2013 |
| DE | 102009050502 A1 | 12/2010 |

(Continued)

*Primary Examiner* — Richard A Goldman
(74) *Attorney, Agent, or Firm* — David R. Stevens; Stevens Law Group

(57) ABSTRACT

Example sinkhole detection systems and methods are described. In one implementation, a method receives data from multiple sensors mounted to a vehicle and analyzes the received data to identify a sinkhole in a roadway ahead of the vehicle. If a sinkhole is identified, the method adjusts vehicle operations and reports the sinkhole to a shared database and/or another vehicle.

18 Claims, 6 Drawing Sheets

(56) References Cited

U.S. PATENT DOCUMENTS

| | | | |
|---|---|---|---|
| 2010/0023213 A1 | 1/2010 | Mizuno | |
| 2010/0023214 A1* | 1/2010 | Horiguchi | B60C 3/06 701/40 |
| 2010/0097455 A1* | 4/2010 | Zhang | G06K 9/00798 348/119 |
| 2010/0098290 A1* | 4/2010 | Zhang | B60W 30/00 382/100 |
| 2010/0100268 A1* | 4/2010 | Zhang | B60W 30/09 701/25 |
| 2010/0121577 A1* | 5/2010 | Zhang | G06K 9/00798 701/301 |
| 2010/0324781 A1 | 12/2010 | Gagliano | |
| 2012/0101725 A1* | 4/2012 | Kondekar | A01B 69/00 701/445 |
| 2012/0203428 A1* | 8/2012 | Choi | B60G 17/016 701/37 |
| 2014/0160295 A1 | 6/2014 | Kyomitsu | |
| 2014/0277900 A1* | 9/2014 | Abhyanker | G01C 21/32 701/25 |
| 2015/0012165 A1 | 1/2015 | Israelsson | |
| 2015/0254986 A1* | 9/2015 | Fairfield | G08G 1/22 707/687 |
| 2015/0331090 A1* | 11/2015 | Jeong | G01S 7/35 342/83 |
| 2016/0093212 A1* | 3/2016 | Barfield, Jr. | H04N 7/185 348/144 |
| 2016/0159381 A1* | 6/2016 | Fahmy | B61L 15/0081 701/19 |
| 2017/0291539 A1* | 10/2017 | Avery | B60N 2/002 |
| 2017/0313332 A1* | 11/2017 | Paget | B61L 27/0077 |
| 2017/0357860 A1* | 12/2017 | Lee | G06K 9/00805 |
| 2018/0118219 A1* | 5/2018 | Hiei | B60W 40/09 |
| 2018/0143631 A1* | 5/2018 | Myers | G08G 1/0967 |
| 2018/0253977 A1* | 9/2018 | Oshida | B60W 30/165 |

FOREIGN PATENT DOCUMENTS

| | | |
|---|---|---|
| DE | 102015012036 | 4/2016 |
| GB | 2525839 A | 11/2015 |
| WO | WO-2016130719 A2 | 8/2016 |

\* cited by examiner

SINKHOLE DETECTION SYSTEMS AND METHODS

TECHNICAL FIELD

The present disclosure relates to vehicular systems and, more particularly, to systems and methods that detect the presence of a sinkhole in a roadway.

BACKGROUND

Automobiles and other vehicles provide a significant portion of transportation for commercial, government, and private entities. Vehicles, such as autonomous vehicles, drive on roadways that may experience structural decay and other problems that put vehicles, and their occupants, at risk. In some situations, a sinkhole may develop in a portion of the roadway. A sinkhole is a hole or depression in the ground (or roadway surface) that is typically caused by a collapse of the surface layer. Sinkholes can vary in diameter and depth. For example, a small sinkhole may be a few feet in diameter and a few feet deep. Larger sinkholes can be hundreds of feet in diameter and 10-100 feet deep. A sinkhole may form gradually over time or may appear suddenly when the ground below the roadway quickly stops supporting the roadway surface.

The presence of a sinkhole in a roadway presents a significant risk to the vehicle and its occupants if the vehicle falls into the sinkhole. Detection of a sinkhole in the roadway ahead of a vehicle can reduce the likelihood of accidents and potential injury to vehicle occupants.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
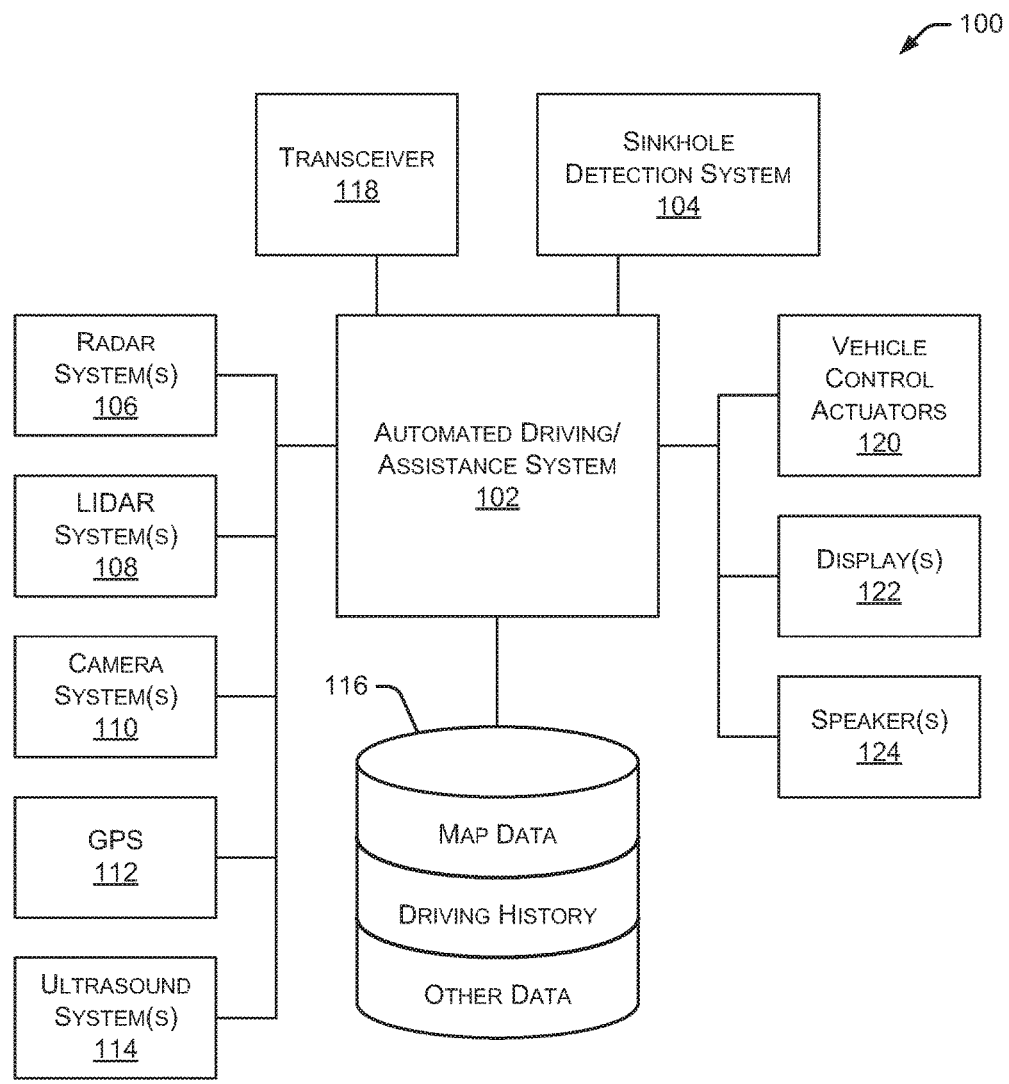
FIG. 1 is a block diagram illustrating an embodiment of a vehicle control system that includes a sinkhole detection system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 that includes a sinkhole detection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes sinkhole detection system 104 that interacts with various components in the vehicle control system to detect and respond to sinkholes in a roadway near the vehicle. In one embodiment, sinkhole detection system 104 detects a sinkhole in the path of the vehicle (e.g., ahead of the vehicle) and adjusts one or more vehicle operations to avoid the sinkhole, such as stopping the vehicle or maneuvering the vehicle around the sinkhole. Although sinkhole detection system 104 is shown as a separate component in FIG. 1, in alternate embodiments, sinkhole detection system 104 may be incorporated into automated driving/assistance system 102 or any other vehicle component.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. Additionally, data store 116 may store information related to sinkholes previously detected by the current vehicle or reported by other vehicles. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on a route that maneuvers the vehicle around an approaching sinkhole in the roadway. The sensor systems/devices 106-110 and 114 may be used to obtain real-time sensor data so that the automated driving/assistance system 102 can assist a driver or drive a vehicle in real-time.

Figure 2:
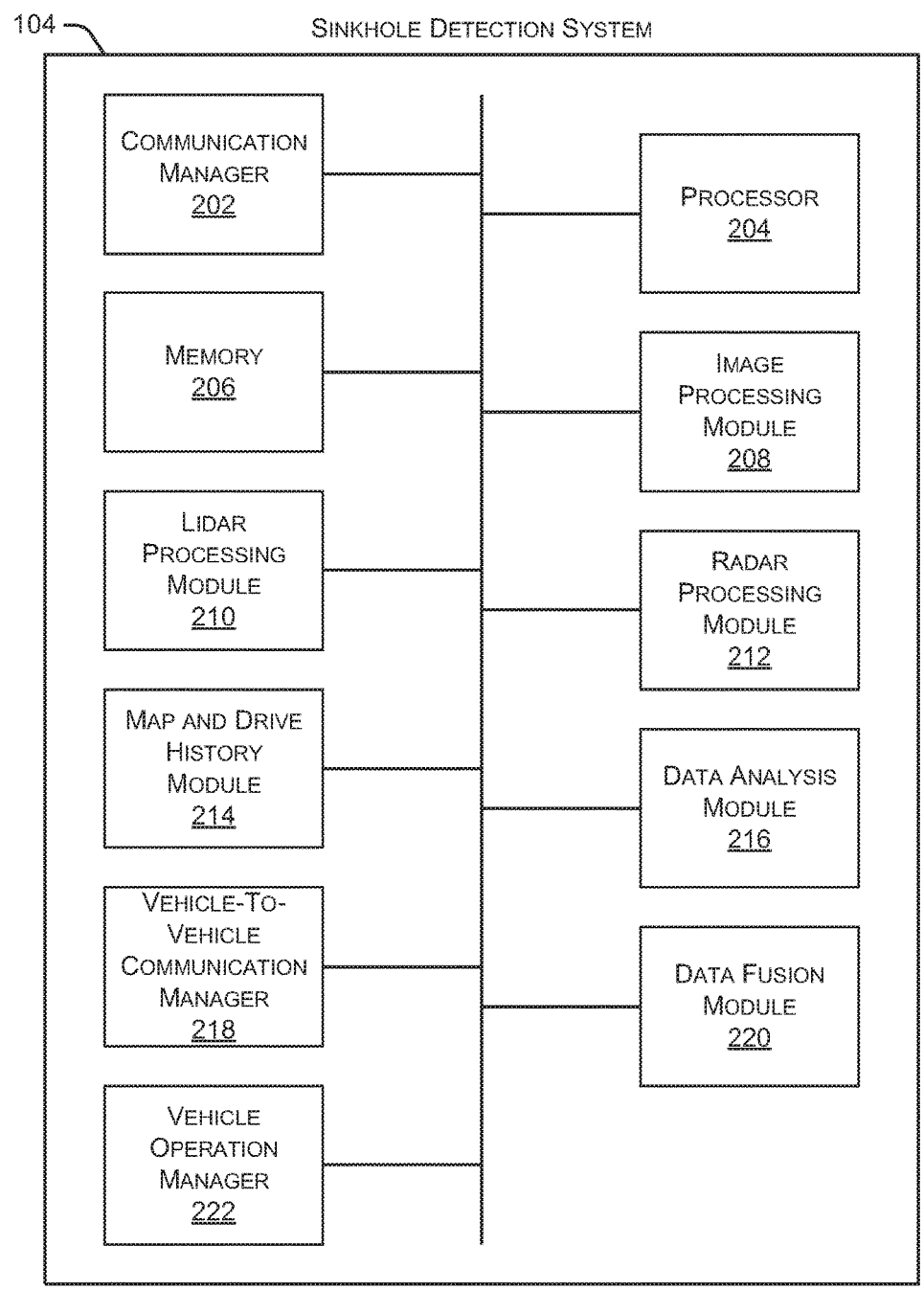
FIG. 2 is a block diagram illustrating an embodiment of a sinkhole detection system.

FIG. 2 is a block diagram illustrating an embodiment of sinkhole detection system 104. As shown in FIG. 2, sinkhole detection system 104 includes a communication manager 202, a processor 204, and a memory 206. Communication manager 202 allows sinkhole detection system 104 to communicate with other systems, such as automated driving/assistance system 102. Processor 204 executes various instructions to implement the functionality provided by sinkhole detection system 104 as discussed herein. Memory 206 stores these instructions as well as other data used by processor 204 and other modules and components contained in sinkhole detection system 104.

Additionally, sinkhole detection system 104 includes an image processing module 208 that receives image data from one or more camera systems 110 and identifies, for example, sinkholes in a roadway near the vehicle. In some embodiments, image processing module 208 includes a sinkhole detection algorithm that identifies an area in the roadway ahead of the vehicle that is likely to contain a sinkhole. For example, the sinkhole detection algorithm may identify areas of the image where the roadway surface looks significantly different or where the pavement or pavement markings end abruptly. A LIDAR processing module 210 receives LIDAR data from one or more LIDAR systems 108 and identifies, for example, a sinkhole in the roadway ahead of the vehicle. In some embodiments, the sinkhole detection algorithm detects areas in the roadway where Lidar ground plane points are not received or where the ground plane points are much deeper than expected. Additionally, a radar processing module 212 receives radar data from one or more radar systems 106 to identify, for example, a sinkhole in the planned path of the vehicle. In some embodiments, the sinkhole detection algorithm can use radar data to detect other vehicles falling into a sinkhole, as discussed herein.

Sinkhole detection system 104 also includes a map and drive history module 214 that receives road map information from one or more data sources, and receives vehicle drive history data from data store 116. In some embodiments, map and drive history module 214 uses the road map and drive history data to detect a difference in road surface height (or elevation) or a difference in vehicle elevation, indicating the possibility of a sinkhole in the roadway. A data analysis module 216 performs various operations on data received from any number of sensors and/or data sources to detect the existence of a sinkhole in the roadway, as discussed herein.

Additionally, sinkhole detection system 104 includes a vehicle-to-vehicle communication manager 218 allows multiple vehicles to communicate with one another, such as communicating the existence of a sinkhole to nearby vehicles. A data fusion module 220 fuses data from multiple sensors, cameras, and data sources, as discussed herein. A vehicle operation manager 222 manages the operation of a vehicle based on detection of a sinkhole, such as stopping the vehicle or maneuvering the vehicle around the sinkhole.

Figure 3:
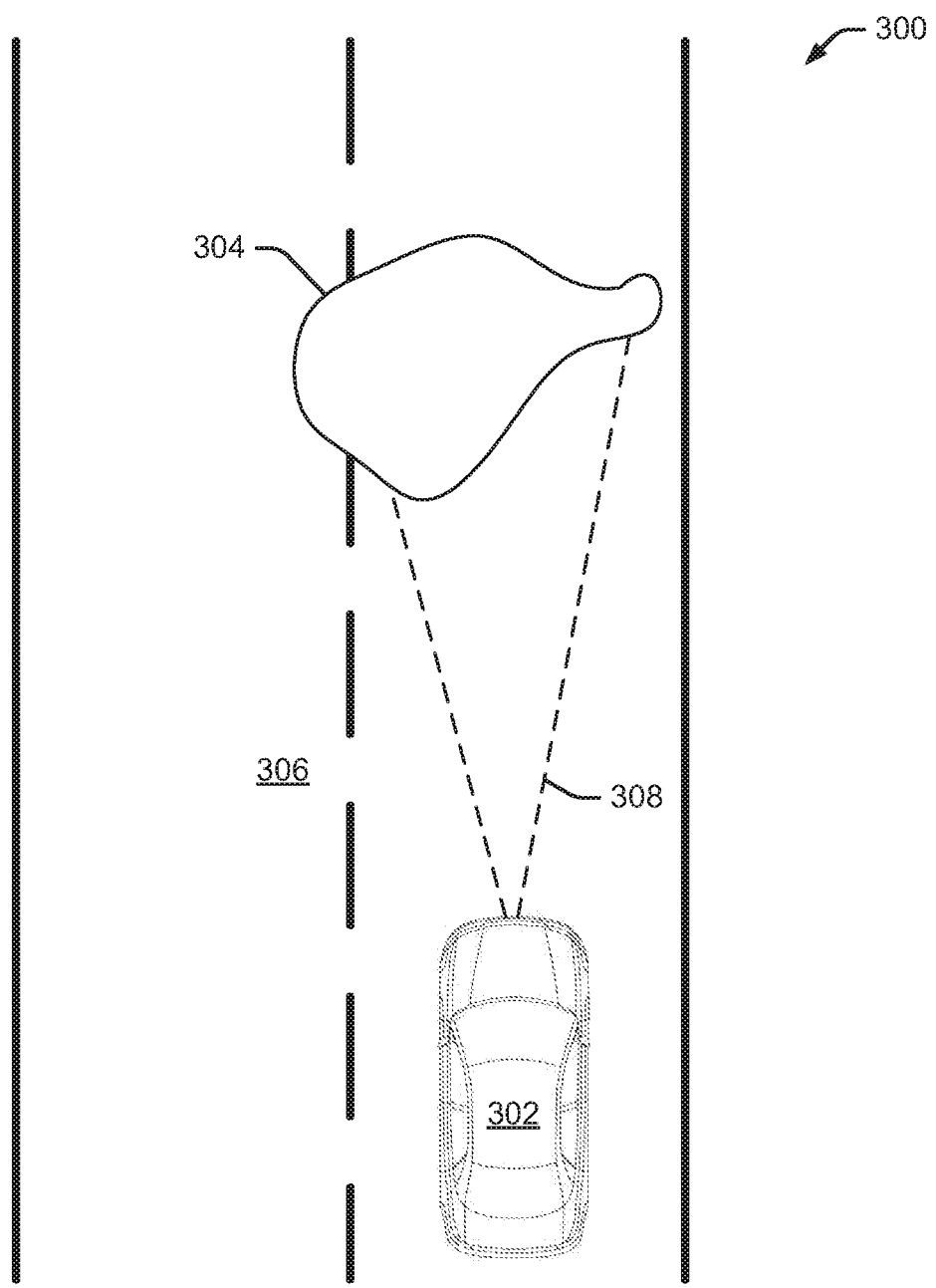
FIG. 3 illustrates an embodiment of a vehicle approaching a sinkhole in a roadway.

FIG. 3 illustrates an embodiment 300 of a vehicle approaching a sinkhole in a roadway. A vehicle 302 is traveling along a roadway 306 and is approaching a sinkhole 304 in the roadway. One or more vehicle sensors (e.g., radar systems 106, LIDAR systems 108, and camera systems 110) may detect sinkhole 304 as indicated by broken lines 308 representing the detection area identified by the sensors. In some embodiments, a vehicle may attempt to maneuver around sinkhole 304 in the roadway. However, in some situations, vehicle 302 may not be able to maneuver around sinkhole 304 without driving off the roadway, driving into oncoming traffic, or causing further collapse around the edge of sinkhole 304. In these situations, the systems and methods described herein adjust the operation of vehicle 302, such as stopping vehicle 302 prior to reaching sinkhole 304.

Figure 4:
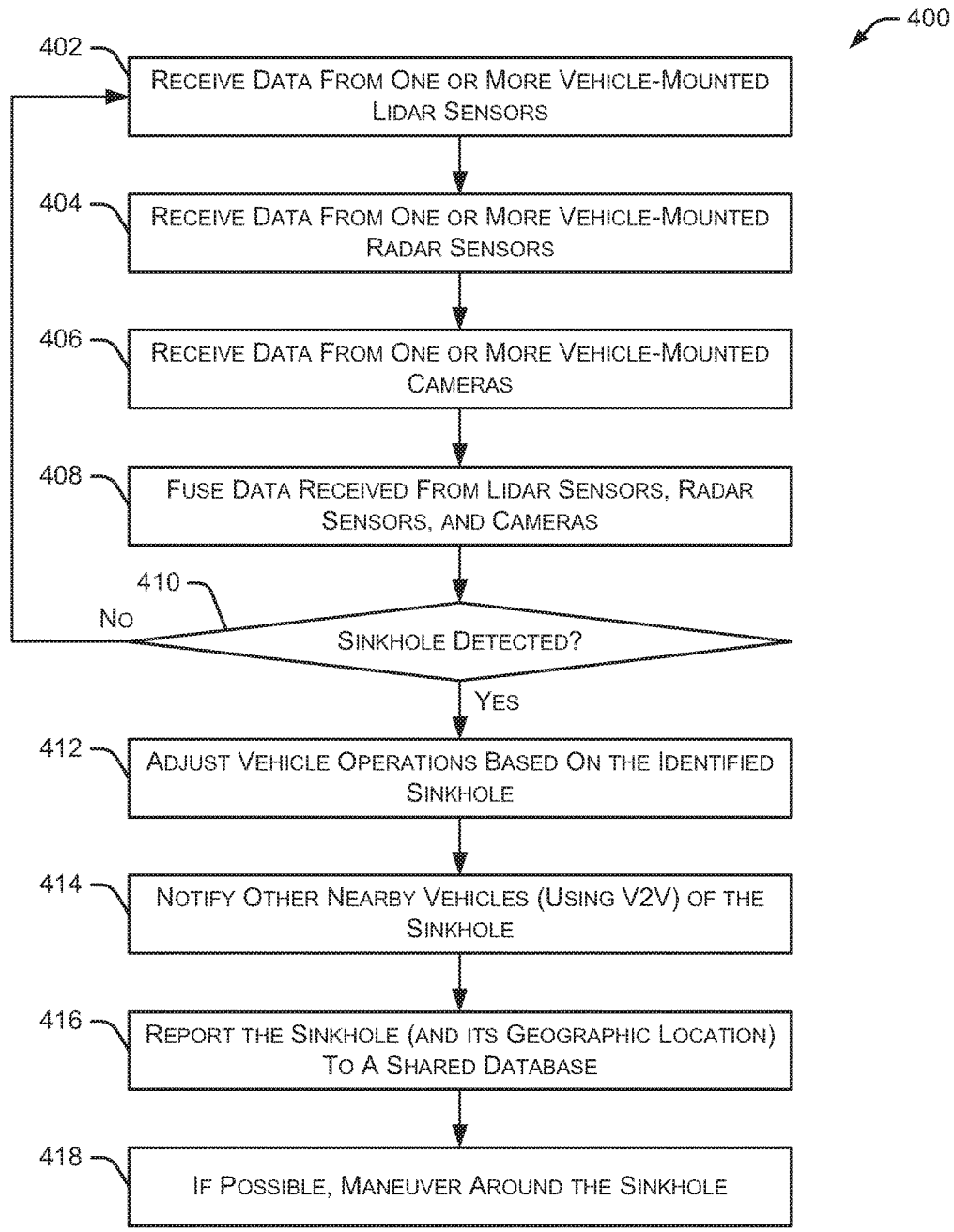
FIG. 4 illustrates an embodiment of a method for detecting a sinkhole in a roadway near a vehicle.

FIG. 4 illustrates an embodiment of a method 400 for detecting a sinkhole in a roadway near a vehicle. Initially, method 400 receives 402 data from one or more vehicle-mounted Lidar sensors and receives 404 data from one or more vehicle-mounted radar sensors. At least some of the data received from Lidar and radar sensors is associated with an area ahead of the vehicle. Method 400 also receives 406 data (e.g., images) from one or more vehicle-mounted cameras, such as a forward-facing camera that captures images of the roadway ahead of the vehicle.

Method 400 continues by fusing 408 data received from the Lidar sensors, radar sensors, and cameras. The fused data is analyzed to determine 410 if a sinkhole is present in the roadway ahead of the vehicle. For example, the Lidar data may indicate the likelihood of a sinkhole based on the lack of ground plane points being returned to the Lidar sensor or the returned ground plane points indicate a roadway surface much deeper than expected. In some embodiments, the Lidar data identifies the three dimensional geometry of the environment ahead of the vehicle. The Lidar data is then used to identify a sinkhole based on the geometry and physical positioning of objects affected by the sinkhole, such as other vehicles. The sinkhole identification based on the Lidar data can be confirmed (e.g., increase the likely existence of a sinkhole) by additionally analyzing camera image data in the area of the detected sinkhole using the Lidar data. If the camera image data also indicates the likelihood of a sinkhole, then the confidence of the detection of a sinkhole is increased.

If no sinkhole is detected at 410, the method returns to 402 and continues receiving and analyzing sensor data. If a sinkhole is detected at 410, one or more vehicle operations are adjusted 412 based on the identified sinkhole. The operations performed or adjusted may vary depending on, for example, whether the vehicle can drive around the sinkhole and whether other vehicles are already stopped or driving near the sinkhole. Since a sinkhole may have unstable edges, vehicle operations may intentionally keep the vehicle a significant distance from the sinkhole to prevent the weight of the vehicle from further collapsing the edge of the sinkhole and thereby enlarging the size of the sinkhole.

The vehicle that detects the sinkhole may also notify 414 other nearby vehicles of the existence and location of the sinkhole. For example, the vehicle may use vehicle-to-vehicle (V2V) communication systems or any other communication mechanism to provide notifications to nearby vehicles. Additionally, the vehicle that detects the sinkhole may report 416 the existence and geographic location of the sinkhole to a shared database that can be accessed by other vehicles, road service organizations, local emergency service providers, news agencies, and the like. Method 400 also attempts to determine 418 a path to safely maneuver around the sinkhole and provides the path to a driver of the vehicle and/or automated driving/assistance system 102.

Figure 5:
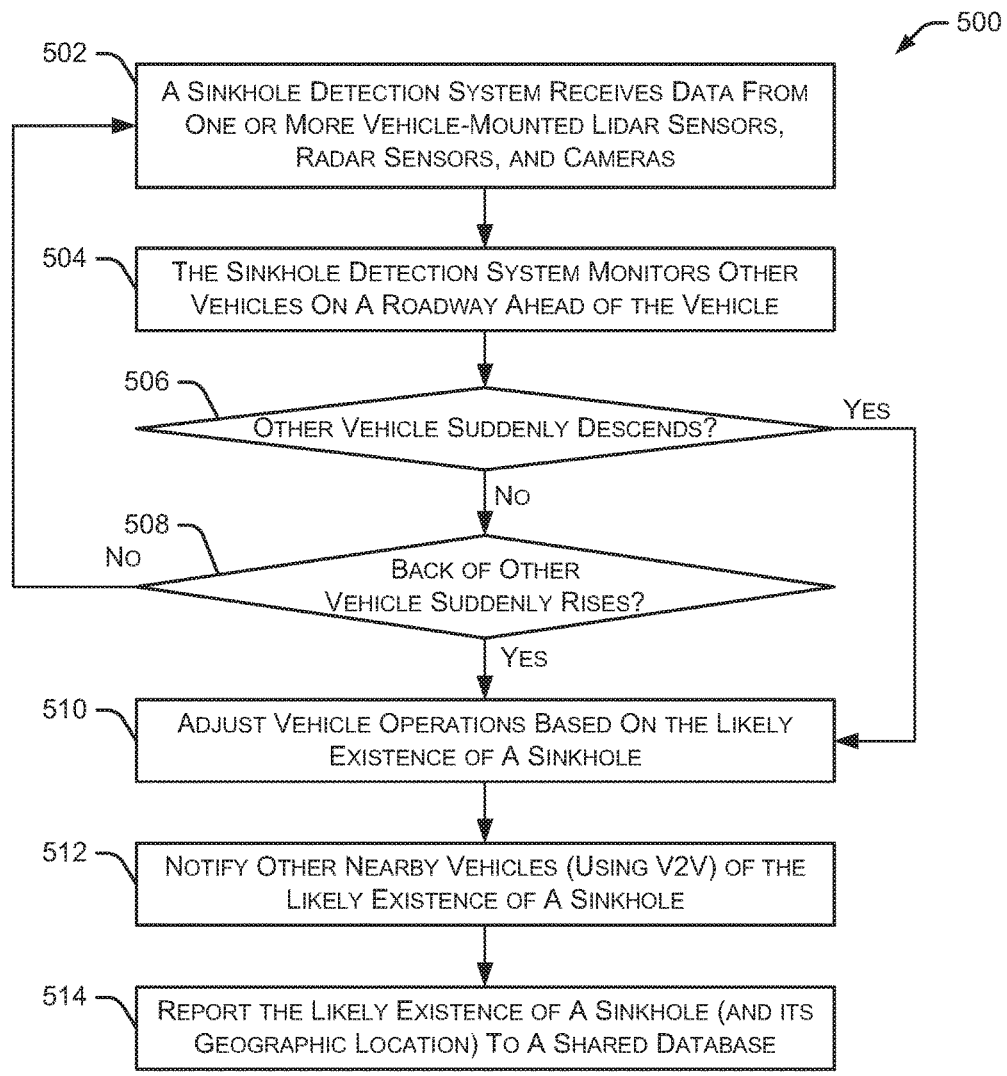
FIG. 5 illustrates an embodiment of a method for detecting another vehicle falling into a sinkhole.

FIG. 5 illustrates an embodiment of a method 500 for detecting another vehicle falling into a sinkhole. Initially, a sinkhole detection system receives 502 data from one or more vehicle-mounted Lidar sensors, radar sensors, and cameras. The sinkhole detection system monitors 504 other vehicles on a roadway ahead of the vehicle on which the sensors and cameras are mounted. Method 500 monitors and analyzes the other vehicles based on the received data to detect 506 one of the other vehicles suddenly descending (e.g., a sudden descent with respect to the roadway surface). This sudden descending of another vehicle may indicate that the vehicle is falling into a sinkhole.

The sinkhole detection system also monitors and analyzes the other vehicles based on the received data to detect 508 the back of another vehicle suddenly rising with respect to the roadway surface. This sudden rising of the back of another vehicle may indicate that the front of the vehicle is tipping into a sinkhole. For example, if a vehicle is "teetering" or pivoting on the edge of a sinkhole, the front of the vehicle may pivot downward into the sinkhole which causes the back of the vehicle to pivot upward. This upward movement of the rear of the vehicle is an indicator of a possible sinkhole in the roadway ahead of the vehicle.

If another vehicle does not suddenly descend at 506 or a back of another vehicle does not suddenly rise 508, the method returns to 502 and continues receiving and analyzing sensor data. If another vehicle suddenly descends at 506 or a back of another vehicle suddenly rises at 508, method 500 adjusts vehicle operations 510 based on the likely existence of a sinkhole. In some embodiments, either of the two situations discussed above represent unusual vehicle behavior that may indicate a high likelihood of a sinkhole. In some embodiments any combination of Lidar data, radar data, and camera data is used to detect vehicles approaching or falling into a sinkhole. In some implementations, method 500 also detects vehicles that suddenly disappear, such as vehicles that suddenly fall into a sinkhole and are no longer detected by Lidar sensors, radar sensors, or cameras.

The vehicle that detects the sinkhole may also notify 512 other nearby vehicles of the existence and location of the sinkhole. For example, the vehicle may use V2V communication systems or any other communication mechanism to provide notifications to nearby vehicles. Additionally, the vehicle that detects the sinkhole may report 514 the likely existence and geographic location of the sinkhole to a shared database that can be accessed by other vehicles, road service organizations, local emergency service providers, news agencies, and the like.

Figure 6:
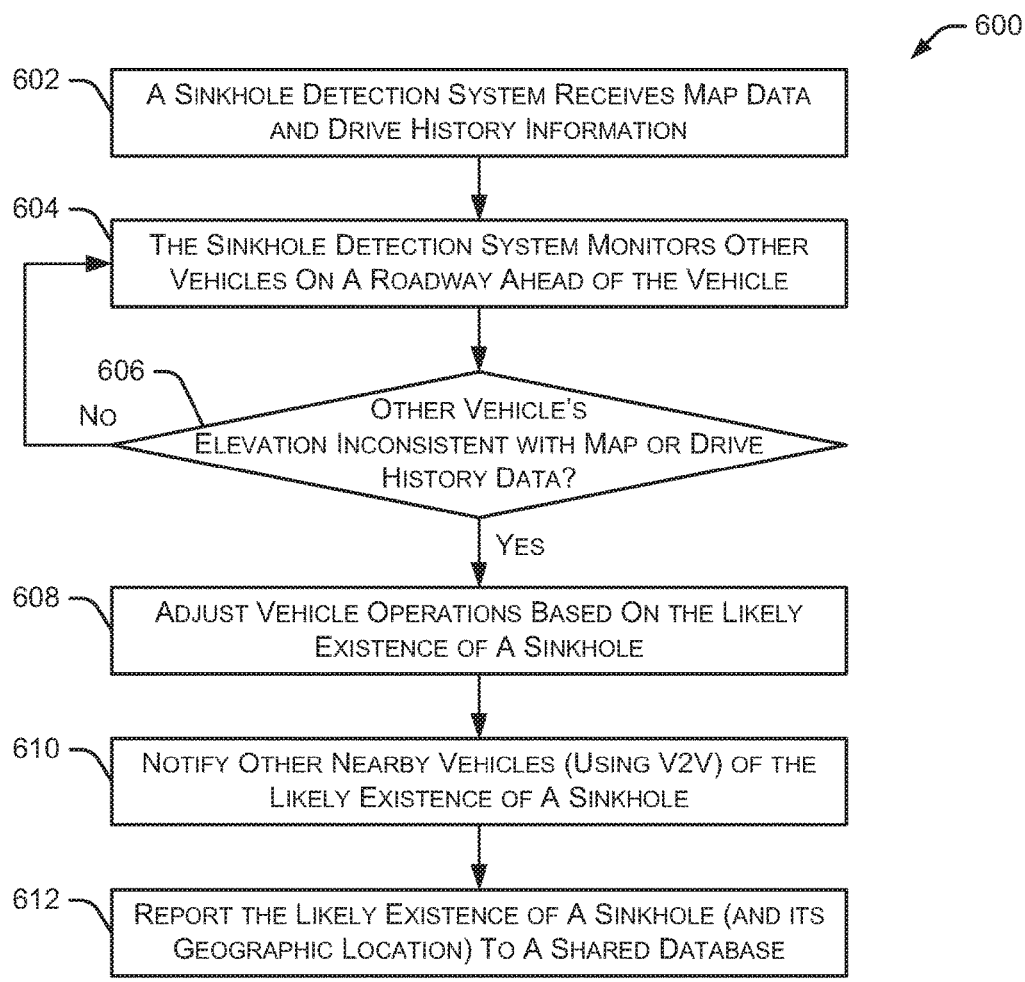
FIG. 6 illustrates another embodiment of a method for detecting another vehicle falling into a sinkhole.

FIG. 6 illustrates another embodiment of a method 600 for detecting another vehicle falling into a sinkhole. Initially, a sinkhole detection system receives 602 map data and drive history information from any number of data sources, such as map data sources, navigation sources, the vehicle's data store 116, and the like. The map data and drive history information may include road elevation and related data. The sinkhole detection system monitors 604 other vehicles on a roadway. Method 600 determines 606 whether another vehicle's elevation is inconsistent with the map or drive history data. For example, if another vehicle (i.e., a vehicle ahead of the vehicle containing the sinkhole detection system) has an elevation that is significantly lower than the map and/or drive history data, the lower elevation may be caused by a sinkhole. In some embodiments, the elevation change that triggers detection of a sinkhole is greater than the height of a typical curb so that a vehicle driving over a curb does not cause detection of a sinkhole. In other embodiments, the elevation change that triggers detection of a sinkhole is based on what is considered a safe obstacle height for vehicles to normally traverse.

If the other vehicle's elevation is consistent with the map or drive history data, then method 600 continues monitoring the elevation of other vehicles on the roadway. If the vehicle's elevation is inconsistent with the map or drive history data, then method 600 adjusts 608 vehicle operations based on the likely existence of a sinkhole. For example, the vehicle may be stopped or may attempt to maneuver around the sinkhole.

The vehicle that detects the sinkhole may also notify 610 other nearby vehicles of the existence and location of the sinkhole. For example, the vehicle may use V2V communication systems or any other communication mechanism to provide notifications to nearby vehicles. Additionally, the vehicle that detects the sinkhole may report 612 the likely existence and geographic location of the sinkhole to a shared database that can be accessed by other vehicles, road service organizations, local emergency service providers, news agencies, and the like.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   receiving data from a plurality of sensors mounted to a vehicle;
   analyzing, using one or more processors, the received data to identify a sinkhole in a roadway ahead of the vehicle; and
   responsive to identification of a sinkhole in the roadway:
      adjusting vehicle operations; and
      reporting the sinkhole to at least one of a shared database and another vehicle;
   wherein analyzing the received data to identify a sinkhole in the roadway includes:
      receiving drive history data describing the roadway ahead of the vehicle, the drive history data including a road elevation for the roadway ahead of the vehicle;
      determining an actual elevation of a second vehicle on the roadway ahead of the vehicle; and
      detecting a difference between the actual elevation and the road elevation;
      in response to detecting a difference between the actual elevation and the road elevation, identifying the sinkhole in the roadway ahead of the vehicle.

2. The method of claim 1, wherein the plurality of sensors include one or more of a Lidar sensor, a radar sensor, and a camera.

3. The method of claim 1, further comprising fusing the data received from the plurality of vehicle sensors.

4. The method of claim 1, wherein analyzing the received data to identify a sinkhole in the roadway includes detecting an area in the roadway that does not return Lidar ground plane points.

5. The method of claim 1, wherein analyzing the received data to identify a sinkhole in the roadway includes detecting an area in data from a camera that does not indicate a roadway surface.

6. The method of claim 1, wherein analyzing the received data to identify a sinkhole in the roadway includes detecting a descent of another vehicle with respect to the roadway.

7. The method of claim 1, wherein analyzing the received data to identify a sinkhole in the roadway includes detecting a rise of a back of another vehicle with respect to the roadway.

8. The method of claim 1, wherein reporting the sinkhole to another vehicle includes communicating with the another vehicle using vehicle-to-vehicle communications.

9. The method of claim 1, wherein adjusting vehicle operations includes stopping the vehicle or maneuvering around the sinkhole.

10. The method of claim 1, wherein the vehicle is an autonomous vehicle.

11. A method comprising:
  receiving data from a plurality of sensors mounted to a first vehicle;
  analyzing, using one or more processors, the received data to identify movement of a second vehicle in a roadway ahead of the first vehicle; and
  responsive to identification of movement of the second vehicle:
    determining the existence of a sinkhole in the roadway ahead of the first vehicle;
    adjusting operation of the first vehicle; and
    reporting the sinkhole to at least one of a shared database and another vehicle;
  wherein determining the existence of the sinkhole in the roadway ahead of the first vehicle comprises:
    receiving drive history data describing the roadway ahead of the vehicle, the drive history data including a road elevation for the roadway ahead of the vehicle;
    determine an actual elevation of a second vehicle on the roadway ahead of the vehicle according to the received data from the plurality of sensors; and
    detecting a difference between the actual elevation and the road elevation for the roadway ahead of the vehicle; and
    in response to detecting the difference is detected between the actual elevation and the road surface height, determining that the sinkhole is in the roadway ahead of the vehicle.

12. The method of claim 11, wherein the plurality of sensors include one or more of a Lidar sensor, a radar sensor, and a camera.

13. The method of claim 11, wherein identifying the movement of the second vehicle includes identifying a descent of the second vehicle with respect to the roadway surface.

14. The method of claim 11, wherein identifying the movement of the second vehicle includes a rise of the back of the second vehicle with respect to the roadway surface.

15. The method of claim 11, wherein reporting the sinkhole to another vehicle includes communicating with the another vehicle using vehicle-to-vehicle communications.

16. The method of claim 11, wherein adjusting operation of the first vehicle includes stopping the first vehicle or maneuvering the first vehicle around the sinkhole.

17. An apparatus comprising:
  a plurality of sensors mounted to a vehicle and configured to capture sensor data;
  a plurality of vehicle control actuators configured to adjust operation of the vehicle; and
  a sinkhole detection system coupled to the plurality of sensors and the plurality of vehicle control actuators, the sinkhole detection system configured to receive and analyze the sensor data to identify a sinkhole in a roadway ahead of the vehicle, the sinkhole detection further configured, responsive to identification of a sinkhole in the roadway, to:
    adjust vehicle operations using the plurality of vehicle control actuators; and
    report the sinkhole to at least one of a shared database and another vehicle;
  wherein the sinkhole detection system is programmed to:
    receive drive history data describing the roadway ahead of the vehicle, the drive history data including a road elevation for the roadway ahead of the vehicle;
    determine an actual elevation of the roadway ahead of the vehicle according to the sensor data; and
    if a difference is detected between the actual elevation and the road elevation, identify the sinkhole in the roadway ahead of the vehicle.

18. The apparatus of claim 17, wherein the plurality of sensors include one or more of a Lidar sensor, a radar sensor, and a camera.

* * * * *